Figure 1:
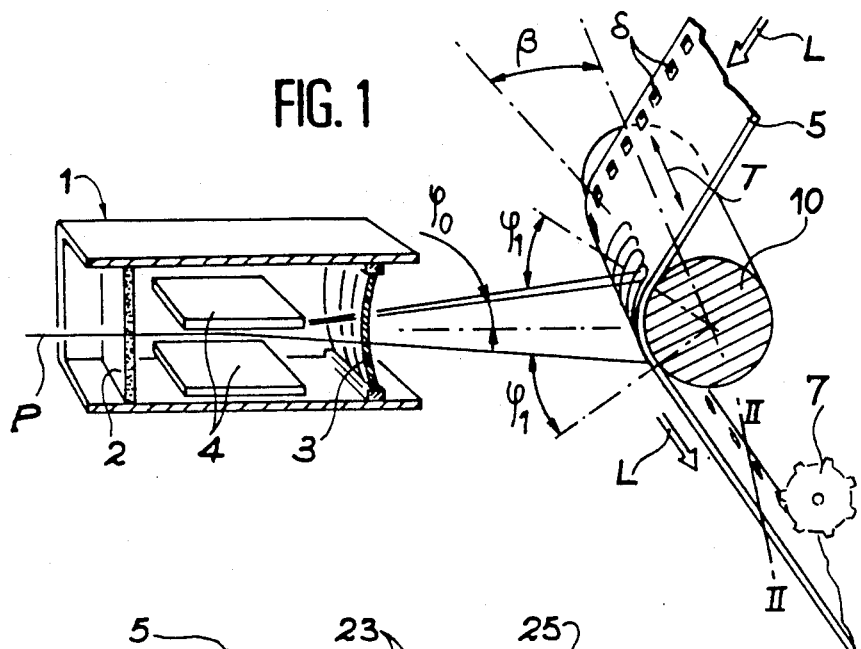

United States Patent [19]
Toulemonde et al.

[11] Patent Number: 4,855,049
[45] Date of Patent: Aug. 8, 1989

[54] MICROPOROUS MEMBRANE OBTAINED BY THE IRRADIATION OF TWO FACES AND PROCESS FOR OBTAINING THE SAME

[75] Inventors: Marcel Toulemonde; Emmanuel Balanzat, both of Caen, France

[73] Assignees: Commissariat A L'Energie Atomique; Centre National de la Recherche Scientifique, both of Paris, France

[21] Appl. No.: 270,677

[22] Filed: Nov. 14, 1988

[30] Foreign Application Priority Data
Nov. 13, 1987 [FR] France ............... 87 15687

[51] Int. Cl.⁴ .............................. B01L 13/00
[52] U.S. Cl. ...................... 210/500.40; 264/22
[58] Field of Search ............ 430/326; 264/22; 210/500.21, 500.25, 500.26, 500.40; 156/654, 643

[56] References Cited

U.S. PATENT DOCUMENTS
2,345,080  3/1944  von Ardenne .
3,753,712  8/1973  Jannbck et al. ............... 156/654 X
3,852,134  12/1974  Bean .

FOREIGN PATENT DOCUMENTS
1436322  10/1970  Fed. Rep. of Germany .
8705850  10/1987  PCT Int'l Appl. .
1375204  11/1974  United Kingdom .

Primary Examiner—Frank Spear
Attorney, Agent, or Firm—Michael N. Meller

[57] ABSTRACT

A first irradiation takes place with particles having an inadequate energy to traverse the membrane (5), followed by a second irradiation from the other face (26) of the membrane (5) using also non-issuing particles and whose trajectories come into contact with those of the other particles. Chemical etching produces pores (respectively 33, 34), whereof some issue into other pores produced during the other irradiation. As the finest pore determines the filtering properties, the selectivity of this membrane is very good.

10 Claims, 2 Drawing Sheets

MICROPOROUS MEMBRANE OBTAINED BY THE IRRADIATION OF TWO FACES AND PROCESS FOR OBTAINING THE SAME

The present invention relates to microporous membranes or diaphragms obtained by the irradiation of two faces, as well as to the process for obtaining the same.

It is alreadly known that it is possible to produce microporous membranes, more particularly usable for filtration, by the irradiation of ionizing particles, which produce defect chains in glass, crystal or polymer membranes and which correspond to the paths thereof. The immediate vicinity to said structural defects is very sensitive to certain chemical agents, which attack or etch the same at a much higher speed than the remainder of the membrane. Thus, pores are produced, whose axes correspond to the path of the ionizing particles. The diameter of the pores is essentialy dependent on the time of exposure to said agents. Widening is firstly very rapid, but then gradually decreases as parts further from the defects are attacked.

However, a problem occurs in that the paths followed by the ionizing particles are of a random nature and can consequently sometimes be very close together and lead to multiple pores, whose sections partly overlap. Thus, such pores are equivalent from the filteirng property standpoint to a single larger diameter pore and which consequently destroys the selectivity of the membrane, whilst permitting the passage of particles which would normally have been stopped.

This problem is particularly important for membranes which are to have a high flow rate, because it is necessary to then give them a greater porosity by a denser particle irradiation. However, the probability of such multiple pores appearing is then increased enormously.

The invention makes it possible to solve this problem. Thus, it relates to a microporous membrane obtained by two separate irradiations successively on the two faces of the membrane and using particles, whose energy is inadequate to entirely traverse the membrane, but adequate to still make possible the intersection of lines of particles which have bombarded the membrane during the two exposures in a median area thereof.

This is followed by chemical attack or etching in the conventional manner. Thus, pores are obtained which do not traverse the membrane and pores which traverse the membrane and which are formed by two separate pores respectively resulting from two irradiations and which have an intersection.

More specifically, the invention relates to a microporous membrane obtained by the irradiation of particles followed by chemical etching producing pores along the particle impact lines, characterized in that it comprises a first network of pores issuing solely on one face of the membrane, a second network of pores issuing solely on the other face of the membrane and in that pores of the first network meet pores of the second network in a median area of the membrane.

Advantageously, the pores of at least one network obliquely penetrate the membrane and preferably the pores of the first network meet the pores of the second network whilst forming an angle of approximately 160°.

The invention is described in greater detail hereinafter relative to non-limitative embodiments and the attached drawings, wherein show:

FIG. 1 An apparatus making it possible to obtian membranes according to the invention.

Figure 2:
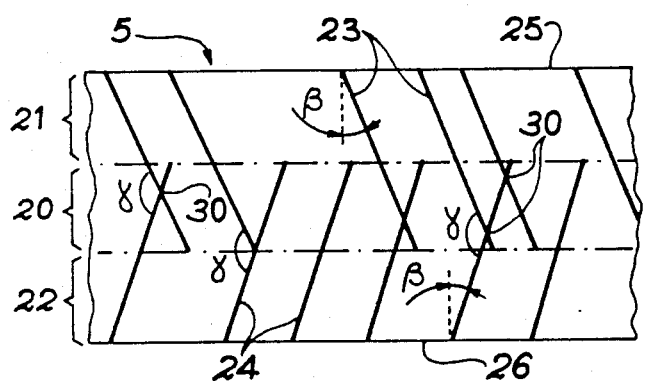

FIG. 2 A cross-section of a membrane following the irradiations according to the invention and along II—II of FIG. 1.

Figure 3:
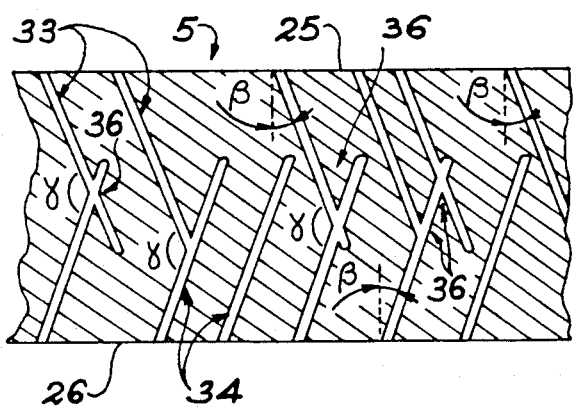

FIG. 3 The membrane already illustrated in FIG. 2, but following chemical etching.

Figure 4:
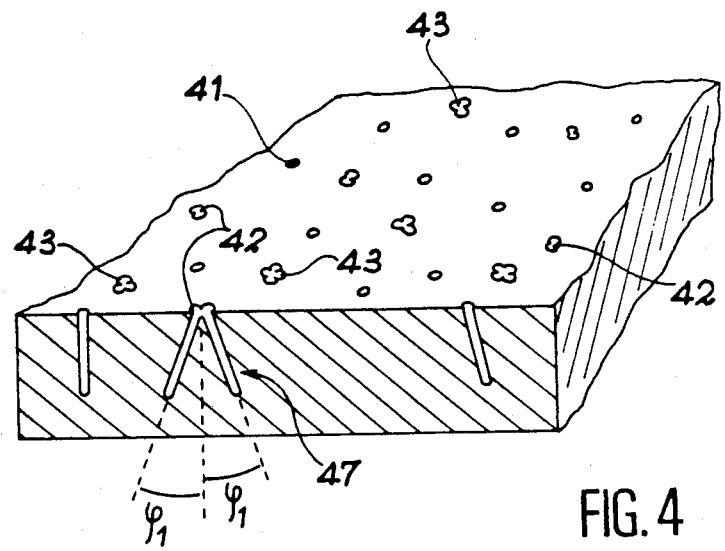

FIG. 4 A perspective view of a membrane after chemical etching more particularly showing its surface.

Figure 5:
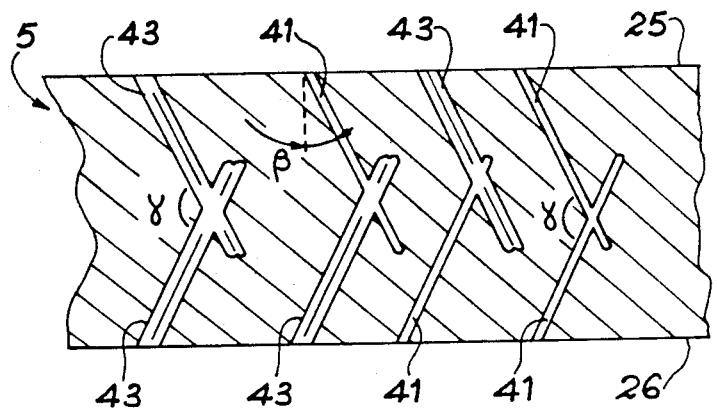

FIG. 5 The main configuration of pores which can be observed on a membrane.

FIG. 1 shows the end of a particle accelerator 1 successively provided with a carbon sheet 2, which partly traps the electronic ion cloud forming a beam P and thus increases the electrical charge thereof, a magnet 4 which produces a time-variable magnetic field and which therefore gives the beam P a variable deflection, as well as a tight wall 3 making it possible, at the cost of an acceptable decrease of the energy of the ions, to place a membrane 5 to be irradiated, located along the path of beam P, in the ambient air or in an oxygen atmosphere, which will make the chemical etching easier. The thickness of the membrane 5 can vary between approximately 15 and 250 micrometres.

The variation of the magnetic field produced by the magnets 4 consequently makes it possible for the beam P to transversely sweep membrane 5 in accordance with arrows T.

The particles of beam P can e.g be argon, krypton or xenon ions. The ion source can be continuous or intermittent. In the first case, it is necessary for the sweep to take place at a constant speed in order to obtain a homogeneous irradiation density on the membrane 5. In the second case, the sweeps must be synchronized on the emission times of the beam P.

Membrane 5 passes in front of beam P in a longitudinal direction indicated by arrows L with the aid of a toothed wheel 7, whereof the teeth penetrate notches 8 on the edge thereof in the manner of the perforations of photographic films. The membrane 5 can pass in front of the particle beam P, whilst held straight taut. However, as is shown here becomes it is more advantageous, it can be held taut in inwardly curved manner on a roller 10 positioned in front of the particle beam P. Beam P is then divergent and is fan-shaped with an opening angle $2\rho_0$ in the longitudinal direction L. Thus, the particles irradiate membrane 5 in accordance with an incidence which can vary between $+\rho_1$ and $-\rho_1$ and which is a function of $\rho_0$ and the radius of roller 10.

According to the invention, membrane 5 is obliquely taut in accordance with the transverse direction in front of beam P. Using the apparatus of FIG. 1, the rotation axis of roller 10 consequently forms an angle $\beta+90°$ with the mean direction of beam P, not deflected by magnet 4 and after deducting the divergency $2\rho_0$.

Particle accelerator 1 is advantageous because it makes it possible to regulate at random the energy of the particles of beam P. However, it is not indispensable to the realization of the invention and can be replaced by a fissile material source.

Thus, membrane 5 is allowed to pass in front of beam P and is then turned and irradiated from the other side. The particles have an inadequate energy to entirely traverse the membrane 5, but the energy is adequate to reach, in a median area 10 in the core of membrane 5, locations traversed during the other irradiation by particles which have irradiated the membrane 5 from its other face. this is illustrated in FIG. 2, where 23 is the trajectories of the particles which have penetrated by one of the faces 25 of the membrane 5, whilst 24 designates the particle lines which have penetrated the membrane 5 by its other face 26. It is possible to see three different zones in membrane 5, namely two surface zones 21, 22 in which it is only possible to find lines 23, 24 and a median zone 20 in which it is possible to simultaneously find lines 23, 24. The intersections between lines 23, 24 is designated 30.

In the case where use is made of a particular accelerator, the energy of the latter can be perfectly regulated so that the thicknesses of the three membrane zones 20, 21, 22 remain uniform and can be perfectly defined by the user. The thickness of zone 20 cna be between 10 and 200 micrometres and the thickness of zones 21, 22 between 5 and 50 micrometres. In the case of a fissile material source, particles with mroe heterogeneous energy levels are obtained and it is necessary to accept a reduced membrane regularity.

In the sectional plane, the incidence of lines 23, 24 with respect to faces 25, 26 is $\beta$, if the slight incidence variations produced by the transverse sweep of the beam P are ignored. Thus, at the intersections 30 lines 23, 24 form angles of approximately $180°-2\beta$. In the plausible case where $\beta$ is equal to 10°, the intersection angle $\gamma$ is consequently equal to 160°.

It should be noted that in a plane perpendicular to the sectional plane of FIG. 2, the incidence of lines 23, 24 on membrane 5 is variable and is between $+\rho_1$ and $-\rho_1$, as was shown hereinbefore.

FIG. 3 shows the same membrane 5 after chemical etching or attack. Lines 23 and 24 of the particles of beam P physically correspond to chains of structural defects produced in membrane 5 during the passage of the particles and which are etched or attacked at a much greater speed than the healthy particles during the chemical etching. Thus, pores 33 and 34 have been hollowed out around the lines 23, 24 respectively and their diameter is dependent on the duration of the chemical action. It can be seen that a certain number of pores 33, 34 are blind in membrane 5, but that pairs of pores 33, 34 corresponding to the lines of particles having an intersection 30, now constitute pores designated 36 and which completely traverse the membrane 5. Thus, it is possible for a single pore 33 to issue into several pores 34 and vice versa. The solids which membrane 5 has to filter are consequently obliged to pass through pores 36.

In an embodiment of the invention, membrane 5 was constituted by a 40 micron thick polycarbonate film. Irradiation was carried out with the aid of a krypton ion beam, whose intake energy into membrane 5 is 1.7 MeV per nucleon. The bema was divergent, so as to irradiate the film over a height of 10 mm, whilst the transverse sweep width was a few hundred millimetres.

Roller 10 had a radius of 15 mm and angle $\beta$ was 10°. The intensity of beam P and the passage speed of membrane 5 were regulated so as to obtain a density of 300 million impacts per square centimetre on each face.

The chemical treatment was carried out under ultraviolet radiation from a mercury lamp at a dose of 20 mWh/cm². Chemical etching performed in 3N soda at 45° C. lasted one hundred minutes and pores with a diameter of approximately 0.2 micron were obtained.

Other possible realization examples are summarized in table 1.

TABLE I

| REALIZATION EXAMPLES | | | | | | |
|---|---|---|---|---|---|---|
| e | E | N | C | T | t | D |
| 15 | 0.3 | $6 \cdot 10^8$ | 3 | 45 | 100 | 0.2 |
| 40 | 1.7 | $3 \cdot 10^8$ | 2 | 45 | 200 | 0.2 |
| 40 | 1.7 | $3.6 \cdot 10^7$ | 3 | 65 | 100 | 1 |
| 250 | 9 | $1.2 \cdot 10^7$ | 3 | 65 | 100 | 1 |
| 100 | 4 | $7.5 \cdot 10^7$ | 2 | 65 | 80 | 0.4 | e = thickness of membrane 5 in micrometers
E = intake energy of the ions of beam P into membrane 5 in MeV/nucleon, in the case of Kr ions,
N = number of impacts per cm²,
C = normality of the chemcal etching agent in the case of NaOH,
T = temperature of the chemical etching agent in °C.,
t = duration of chemical etching in minutes,
D = diameter of the pores in micrometers.

In all the cases the beam irradiates the film over a height of 10 mm and the roller 10 has a radius of 15 mm.

The interest of the invention will now be justified and for this purpose reference is made to FIGS. 4 and 5.

FIG. 4 shows the surface of a membrane 5 with pores. As the impacts of the particles are of a random nature, it is inevitable that alongside the single pores 41 there will be double and multiples pores 42, 43 obtained as a result of impacts which are very close together of respectively two or more than two particles. These pores are connected during the chemical etching and thus ultimately produce a single larger section pore. The multiples pores 43, obtained by the joining of at least three pores, are particularly prejudicial because their section allows an inscribed circle which is larger than the diameters of the single pores 41. They consequently permit the passage of solids, which would normally have been retained by the membrane 5 and thus destroy the selectivity thereof.

By means of the roller 10, it is possible to prevent to a significant extent the creation of multiple pores. As the incidences of the particles are then variable, two pores which coincide initially on one of the faces of the membrane can then separate. This is represented by group 47, which shows the divergence of the directions which can reach $2\rho_1$. However, this improvement is inadequate when it is wished to obtain extremely selective membranes.

FIG. 5 shows four different ypes of issuing pores 36 according to the invention. From left to right in the drawing, it is possible to see a multiple pore 43 issuing onto the face 25 having an intersection with another multiple pore 43 issuing on face 26, a single pore 41 (the reasoning would also apply to a double pore 42) issuing onto a multiple pore 43, a multiple pore 43 issuing onto a single pore 41 and a single pore 41 issuing onto another single pore 41.

It is clear than only the first of these types of prejudicial to the selectivity of the membrane 5. In the case of the other two types shown in the centre of FIG. 5, the single pores 41 stop the larger diameter solids which would have been able to enter the multiple pores 43. In other words, in these mixed types having connections between pores of different natures, it is the smallest diameter pore which determines the filtering properties, i.e. the single pore 41.

It can therefore be concluded that the multiple pores 43 not issuing onto the two faces 25, 26 are not necessarily harmful to the selectivity of the membrane 5. As their proportion with respect to the total number of pores remains relatively small (a few per cent), the proportion of pores of the type shown at the left-hand end of FIG. 5, which is equal to the square of said proportion, is even smaller.

The selectivity gain compared with the conventional microporous membranes is consequently high, namely approximately 10, 100 or 1000 as a function of the irradiation parameters, namely the divergence angle $p_0$, the angle $p_1$ defined by the roller 10, the overall porosity and the penetration depth of the pores. The probability of retaining solids with a diameter larger than that of the pores 41 can exceed 99.999%.

The membranes 5 according to the invention are interesting in another respect. Firstly it is possible to accept much larger porosities (ratio of the sum of the sections of the pores on one face to the surface of said face) than with conventional membranes for a given selectivety. Thus, when the porosity increases, the proportion of multiple pores 43 greatly increases. It is possible to estimate that with conventional membranes and in existing applications, the largest porosity which can be accepted is approximately 10%. However, large porosities are of interest to the extent that they permit greater filtration flow rates. With the membranes 5 according to the invention, it is possible to ignore this limitation and accept porosities of approximately 30 to 35%, which correspond to the limit beyond which membrane 5 no longer has an adequate mechanical strength.

The angle $\gamma$ formed by pores 33 and 34 at their intersection results from a compromise. If the angles $\gamma$ are too close to 180°, this means that the intersection probabilities of pores 33 and 34 are small and that the real porosity of membranes 5 is also small, which is prejudicial to the flow rate. If $\gamma$ becomes too small, the path which has to be followed by the particles filtered through membrane 5 becomes large, which also reduces the flow rate of membrane 5. The best results are obtained with an angle of 160°, but this is not an imperative value conditioning a correct performance of the invention. It is possible to adopt significantly different values without passing beyond the scope of the invention.

Finally, the thickness of the median zone 20 with respect to the surface zones 21, 22 is an important parameter to the extent that it conditions the probability of pores 33, 34 having intersections. If the median zone 20 is thick, there are numerous intersections and the flow rate allowed by membrane 5 is high, particularly in view of the fact that the same pore, e.g. 33 can have an intersection with several pores 34 of another type. However, it must be borne in mind that the high porosity median zone 20 is fragile and that the surface zones 21, 22, which contribute to the mechanical strength of the assembly cannot be too thin.

As a function of the membranes, thicknesses of 10 to 200 micrometres are recommended for the median zone 20 and 5 to 50 micrometres for the surface zones 21, 22.

We claim:

1. Microporous membrane obtained by the irradiation of particles (P) followed by chemical etching producing pores (33, 34) along the impact lines (23, 24) of the particles, characterized in that it comprises a first network (33) of pores issuing only on one face (25) of the membrane (5), a second network of pores (34) only issuing on the other face (26) of the membrane (5) and in that pores of the first network (33) meet pores of the second network (34) in a median area (20) of membrane (5).

2. Microporous membrane according to claim 1, characterized in that the pores of at least one network penetrate the membrane obliquely.

3. Microporous membrane according to claim 2, characterized in that the pores of the first network (33) meet the pores of the second network (34) forming an angle of approximately 160°.

4. Microporous membrane according to claim 3, characterized in that the pores of at least one network penetrate the membrane in accordance with different obliquities ($\pm p_1$).

5. Microporous membrane according to claim 1, chacterized in that the ratio of the total section of the pores of the networks (33, 34) to the surface of the membrane is below 0.35.

6. Microporous membrane according to claim 1, characterized in that the median area (20) of the membrane has a thickness between 10 and 200 micrometres.

7. Microporous membrane according to claim 6, characterized in that the median area of the membrane is located between two surface areas (21, 22) of thickness between 5 and 50 micrometres.

8. Process for the production of microporous membranes, characterized in that it consists of irradiating the membranes (5) on one face (25) by particles (P) with an inadequate energy to traverse the membranes, followed by the reversing of the membranes (5) in order to irradiate the other face (26) by particles (P) of an adequate energy to traverse the membranes, but which is adequate for reaching the parts of the membranes irradiated prior to reversal, and exposing the irradiated membranes to a chemical reagent producing pores around locations where particles (P) have passed.

9. Process for the production of microporous membranes according to claim 8, characterized in that the particles (P) are ions from an accelerator (1).

10. Process for the production of microporous membranes according to claim 8, characterized in that the membranes (5) are taut and curved inwards on a roller (10).

* * * * *